United States Patent [19]

Jenkel

[11] Patent Number: 4,864,706
[45] Date of Patent: Sep. 12, 1989

[54] FABRICATION OF DUAL ALLOY INTEGRALLY BLADED ROTORS

[75] Inventor: Steven D. Jenkel, West Palm Beach, Fla.

[73] Assignee: United Technologies Corporation, Hartford, Conn.

[21] Appl. No.: 84,369

[22] Filed: Aug. 12, 1987

[51] Int. Cl.$^4$ ............................................. B21K 3/04
[52] U.S. Cl. ......................... 29/156.8 R; 29/156.8 B; 29/428
[58] Field of Search .................. 29/158.8 R, 156.8 B, 29/156.8 CF, 469.5, 428, 445, 521; 228/193; 416/95, 96 R; 148/11.5 N, 11.5 P, 11.5 Q, 11.5 R, 11.5 F, 11.5 A, 11.5 C, 11.5 M, 12 R, 902, DIG. 30

[56] References Cited

U.S. PATENT DOCUMENTS

| | | |
|---|---|---|
| 1,269,540 | 6/1918 | Ljungstrom . |
| 1,353,797 | 9/1920 | Steenstrup . |
| 3,304,055 | 2/1967 | Britt ....................................... 416/90 |
| 3,609,841 | 8/1968 | Telfer et al. ......................... 29/156.8 |
| 3,749,514 | 7/1973 | Kelch et al. ........................... 416/96 |
| 3,873,234 | 3/1975 | Penny ..................................... 416/97 |
| 4,012,616 | 3/1977 | Zelahy ................................... 219/9.5 |
| 4,063,939 | 12/1977 | Weaver et al. ................. 29/156.8 R |
| 4,096,615 | 6/1978 | Cross .............................. 29/156.8 R |
| 4,116,723 | 9/1978 | Gill et al. ............................. 148/404 |
| 4,152,816 | 5/1979 | Ewing et al. ................... 29/156.8 R |
| 4,209,348 | 6/1980 | Duhl et al. ............................ 148/410 |
| 4,270,256 | 6/1981 | Ewing ................................ 29/156.8 |
| 4,529,452 | 7/1985 | Walker ......................... 29/156.8 CF |

FOREIGN PATENT DOCUMENTS 2109274 6/1983 United Kingdom ........... 29/156.8 R

Primary Examiner—Carl E. Hall
Assistant Examiner—Irene Cuda
Attorney, Agent, or Firm—Charles E. Sohl

[57] ABSTRACT

Fabrication methods are described for producing an integrally bladed rotor wherein single crystal blade portions are securely metallurgically bonded to a polycrystalline disk. The polycrystalline disk is fabricated with protruding portions in the location where the blades are to be bonded. The blades are fabricated with a root portion having a cavity adapted to mate with the disk protrusions. The blade and disk are assembled and forced. Localized heating causes localized softening metal flow in the disk protrusion. Bonding occurs as a result of this combination of softening and force.

11 Claims, 1 Drawing Sheet

FABRICATION OF DUAL ALLOY INTEGRALLY BLADED ROTORS

DESCRIPTION

1. Technical Field

This invention relates to the fabrication of integrally bladed rotors.

2. Background Art

Gas turbine engines contain a plurality of rotors, each comprised of a disk mounting a plurality of blades at its periphery. The long standing practice in the turbine engine art has been form disks and blades separately and then join them together by mechanical means to produce a rotor assembly. This permits the use of different materials and thereby permits the assembled article to better satisfy the different operating requirements encountered in the disk and blade portions. Both blades and disks are usually made from superalloys which are alloys based on nickel strengthened with gamma prime ($Ni_3Al,Ti$) particles.

However mechanical attachment techniques are inefficient and lead to a finished product which weighs more than it would weigh if it could be formed integrally, i.e. with metallurgical bonds rather than mechanical attachment. In rotating machinery, significant stresses arise from the combined effects of weight and rotational speed. This fact, of course, has generally been recognized and there have been efforts made to fabricate integrally bladed rotors to reduce weight and stress.

In one approach a solid metal disk has blades machined from its periphery. This is a generally tedious and inefficient process and a machining error in any one of the many blades may necessitate the scrapping of the entire disk. In addition, such a process generally necessitates that the blades and disk have a common composition. Other workers have attempted to bond individual blades to a disk portion. This is shown for example in U.S. Pat. Nos. 3,304,055; 3,609,844; 3,749,514; 4,096,615; 4,152,816; 4,270,256; and 4,529,452. These processes have generally employed bonding aids, such as brazing materials but use of such materials does not produce the high strength joints which are necessary in gas turbine engines.

In conventionally assembled gas turbine rotors, the recent trend is to use single crystal turbine blades as described for example in U.S. Pat. Nos. 3,494,709; 4,116,723; and 4,209,348 because of their exceptional high temperature mechanical properties. U.S. Pat. No. 4,592,120 suggests that such single crystal blades might be fabricated into an integrally bladed rotor assembly by a casting process wherein a liquid metal would be poured into a mold containing preformed single crystal blades held in spaced alignment with a central disk portion. This approach has the inherent difficultly of limiting the disk rim properties to those of cast materials whereas it is well known that forged materials provide better overall properties for disk applications.

Accordingly, it is an objective of this invention to describe a method for fabricating integrally bladed rotors having metallurgical bonds between the blades and the disk portion. It is another object of the invention to describe a method for providing an integrally bladed rotor having single crystal blades which are metallurgically bonded to a forged disk portion. These and other objects of the invention will be better understood through consideration of the following disclosure of invention, best mode for carrying out the invention and claims.

DISCLOSURE OF INVENTION

A formed and shaped disk is provided for assembly with preformed blade portions to form an integrally bladed rotor assembly. The disk is forged or made from hot isostatically pressed powder (the term forged will be used herein to encompass HIP powder materials) material having properties which are well matched to the temperatures and stresses encountered in the disk portion of the rotor. The disk portion has on it a plurality of protruding or standoff portions to which the single crystal blades are to be bonded. The single crystal blades are provided with a root portion which contains a recess or cavity which conforms closely to the disk protrusion. Single crystal blades are generally produced by casting but other methods are known.

The single crystal material which defines the cavity is stronger and more resistant to high temperature deformation than the polycrystalline disk material. Thus, when the blade and disk are assembled in mating relationship and force and heat are applied, the disk protrusion will deform and achieve conforming contact with the single crystal portion and bond thereto. Pressure is applied using conventional mechanical means and heat is provided, by the flow of electric current or by induction heating. Use of such heating technique permits close control and localization of the heating.

A significant aspect of the invention is the use of the single crystal cavity as an integral (forging) die cavity which is later removed. Implicit in the success of the invention process is the selection of materials and process parameters such that the process is performed under conditions where the blade cavity is strong enough to resist significant deformation during bonding but softening and deformation of the disk protrusion occurs. The softening temperature can be defined as the temperature at which about 1% material deformation occurs under the selected bonding force in one hour. The single crystal bade has a higher softening temperature than the polycrystalline disk and the bonding temperature used will be a temperature between the two softening temperatures.

After bonding is accomplished, final machining removes those portions of the single crystal which defined the side portions of the cavity leaving behind a single crystal portion firmly bonded to the disk without the use of bond aids.

The foregoing, and other features and advantages of the present invention will become more apparent from the following description and accompanying drawings.

BEST MODE FOR CARRYING OUT THE INVENTION

The present invention is particularly adapted for joining single crystal blades to a polycrystalline disk to form an integrally bladed rotor characterized by having metallic bonds between the blade and disk portion without brazing or other joining aids. Most preferably the disk portion is formed by forging, and the blades are single crystals, for reasons of mechanical properties.

Figure 1:
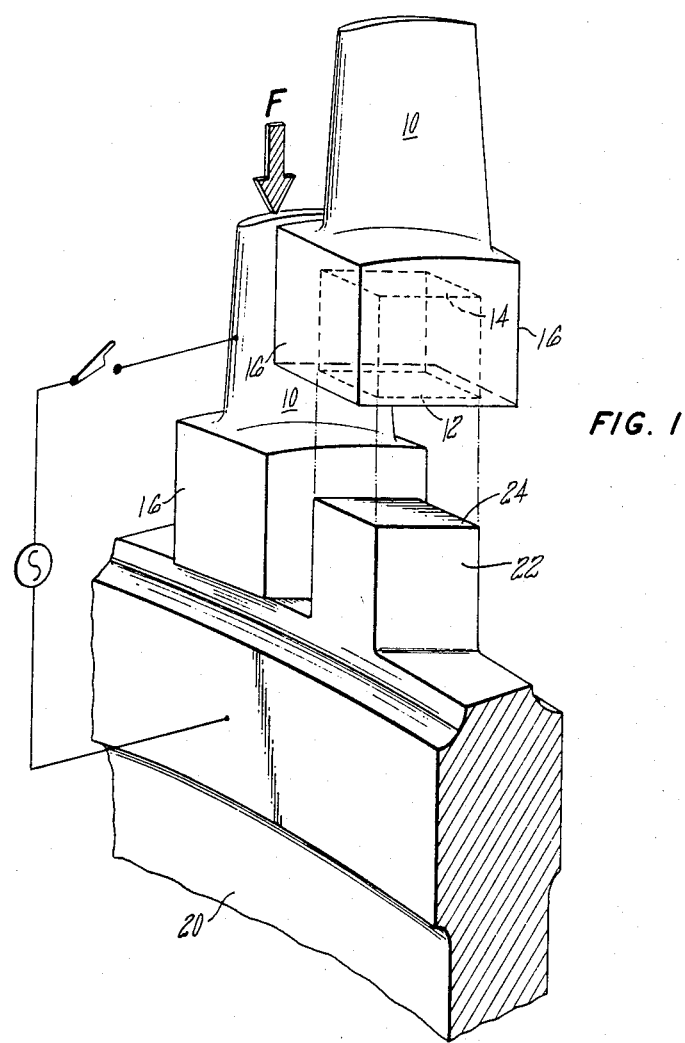
FIG. 1 illustrates the assembly of the blade and disk prior to bonding showing the relationship therebetween.

Turning now to the FIGURES which illustrates the invention, FIG. 1 is a cross-section showing a portion of the disk assembly and one of a plurality of blades which are to be joined thereto. In FIG. 1 the blade 10 has a recess 12 which is adapted to fit over a protrusion 22 which is an integral portion of a disk 20. The protrusion and the recess in the blade are shaped to be closely conforming. In this context, conforming means that the cross section of the cavity and protrusion are closely matched, and preferably the protrusion extends outward from the disk very slightly more than the cavity depth, from about 0.005 to 0.050 inch more, to accommodate bonding deformation. Bonding is desired on the matching surfaces labeled 14 and 24 while the portions 16 of the single crystal blade are present only for purposes relating to bonding and are subsequently removed.

The faying surfaces 14 and 24 between which bonding is desired must be clean and free of any oil, dirt, oxide or the like which could impede either the flow of electrical current or bonding. Such cleaning can be accomplished by techniques known to those skilled in the art including degreasing, grit blasting, chemical cleaning and electrochemical polishing.

This disk material may, for example, be a material referred to as IN 100 (a trademark of the International Nickel Corporation) of nominal composition 10% Cr, 15% Co, 3% Mo, 5.5% Al, 4.7% Ti, 0.18% C, 0.014% B, 0.06% Zr, 1% V, balance Ni. The disk is formed by forging, for example according to U.S. Pat. No. 3,529,503 and the protrusions are given their final form by machining. The blade material may be, for example, a material having a nominal composition of 10% Cr, 5% Al, 1.5% Ti, 4% W, 12% Ta, 5% Co, balance Ni, described in the U.S. Pat. No. 4,209,348 and formed into a single crystal formed by techniques well known to those skilled in the art. The recess in the single crystal blade may be formed by casting, machining, including ECM and EDM, or a combination of these techniques.

Bonding is accomplished using a combination of heat and pressure. Bonding is performed in a vacuum or inert atmosphere to eliminate oxidation. Vacuum is much preferred because of the possibility of inert gas entrapment in the bond. The force is applied normal to the faying surfaces 14 and 24 to be joined and may be developed conveniently by hydraulic means. Bonding forces on the order of 3–15 ksi are appropriate although the exact bonding force required is related to specific materials used and the bonding temperature. Bonding forces are based on the area of the protrusion i.e. the bond area 12 or 14 in FIG. 1. Localized heating of the faying surfaces 12 and 14 is obtained by passing a high current between the blade and disk. The current may be AC or DC and in practice a specific heating cycle whose details vary from application to application will doubtless be arrived at an optimized to produce high strength bonds on repeatable basis. For these particular materials the appropriate bonding temperature is 1800° F.–2050° F. A broad temperature range is 1700° F.–2200° F. The specific temperature selected is one at which the disk material softens (as previously described above) but the blade material does not. A typical current flow to provide the necessary heating would be about 3600–4000 amps per square inch applied for a time of about 0.5 to 4 hours. Under certain conditions, mainly related to part geometry, current flow heating can be replaced with induction heating.

It is within the scope of the invention to use a conventional furnace to heat the blade and disk assembly to an elevated temperature (but less than that desired for bonding) and then to use resistance or induction heating to provide the extra localized heating necessary for bonding. It is also within the scope of the invention to use locally applied electrical insulating layers between the disk protrusion and the blade to localize and control the flow of electric current.

Figure 2:
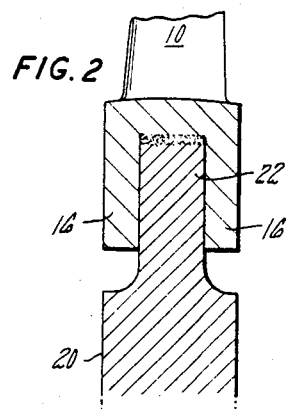
FIG. 2 shows the blade and disk after bonding.

This localized heating in combination with the previously mentioned applied force will cause localized softening, and deformation of the protruding disk portion because of its lesser high temperature properties, and will cause bonding between the faying surfaces as illustrated in FIG. 2.

Figure 3:
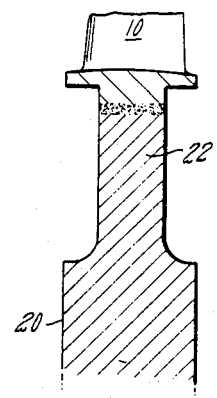
FIG. 3 shows the bonding blade and disk after machining.

Because of the need to reduce weight, the side portion 16 of the single crystal which were initially present in order to define a cavity will usually be removed by conventional machining techniques to leave behind the bonded assembly illustrated in FIG. 3 wherein the single crystal portion is metallurgically bonded to the disk protrusion.

Of course, geometric variations are possible. Specifically, rather than a plurality of individual protrusions, a single continuous protrusion or ridge extending around the disk periphery could be provided to mate with blades having slot-like cavities. Likewise, while the previous description has implied that a single blade would be bonded to a protrusion, a plurality of blades could be integrally cast, or individually cast and bonded together, to form a cluster of blades which could then be simultaneously bonded to a disk. A single crystal blade cluster could have multiple cavities or a single cavity.

Although this invention has been shown and described with respect to detailed embodiments thereof, it will be understood by those skilled in the art that various changes in form and detail thereof may be made without department from the spirit and scope of the claimed invention.

I claim:

1. Method of producing an integrally bladed rotor from a forged disc material and a single crystal blade material with the disc material having a softening temperature which is less than the blade softening temperature including the steps of:
    a. forming a cavity in the root portion of at least one single crystal superalloy blade;
    b. forming a plurality of protrusions on the periphery of a polycrystalline superalloy disk, said protrusions being shaped to conform to the blade cavities;
    c. assembling at least one blade onto at least one disk protrusion;
    d. forcing the blade and disk together;
    e. locally heating the blade cavity/disk protrusion to an elevated temperature is intermediate between the blade and disc material softening temperatures causing the protrusion to deform against the stronger blade cavity;
    f. holding the disk-blade assembly together under conditions of heat and pressure until bonding occurs, and
    g. subsequent to bonding removing a portion of the single crystal which defines the cavity,
    wherein bonding occurs on a plane tangential to the disc periphery.

2. A method as in claim 1 wherein bonding is performed between 1700° F.–2200° F. and an applied pressure of 3–15 ksi.

3. A method as in claim 1 wherein local heating is provided by flowing current between the articles.

4. A method as in claim 1 wherein local heating is provided by induction heating means.

5. A method as in claim 1 wherein bonding is performed under vacuum conditions.

6. Method of joining a single crystal superalloy article having a cavity to a polycrystalline superalloy article having a protrusion which conforms to said cavity, wherein said single crystal article has a softening temperature in excess of the softening temperature of said polycrystalline article including the steps of:
   a. assembling the parts so that the protrusion mates with the cavity;
   b. applying a force to urge the single crystal and polycrystalline articles together;
   c. locally heating the cavity/protrusion to an elevated temperature which is between the softening temperatures of the single crystal and polycrystalline materials thereby causing deformation of the polycrystalline protrusion, with said force and said temperature being chosen so as to cause bonding;
   d. subsequent to bonding removing a portion of the single crystal article which defines the cavity.

7. A method as in claim 6 wherein bonding is performed between 1700° F.–2200° F. and an applied pressure of 3–15 ksi.

8. A method as in claim 6 wherein bonding is performed under vacuum conditions.

9. Method of joining a single crystal superalloy article containing a cavity to a polycrystalline superalloy article having a matching protrusion, said single crystal having a first softening temperature and said polycrystalline article having a second softening temperature, said first softening temperature exceeding said second softening temperature, including the steps of:
   a. assembling said articles so that the protrusion fits into the cavity;
   b. heating the cavity and the protrusion to a temperature between said first and said second temperatures while simultaneously forcing said parts together so that said polycrystalline material conforms to and bonds to said single crystal material.
   c. subsequent to bonding removing a portion of the single crystal article which defines the cavity.

10. A method as in claim 9 wherein local heating is provided by flowing current between the articles.

11. A method as in claim 9 wherein bonding is performed under vacuum conditions.

* * * * *